Patented Oct. 12, 1948

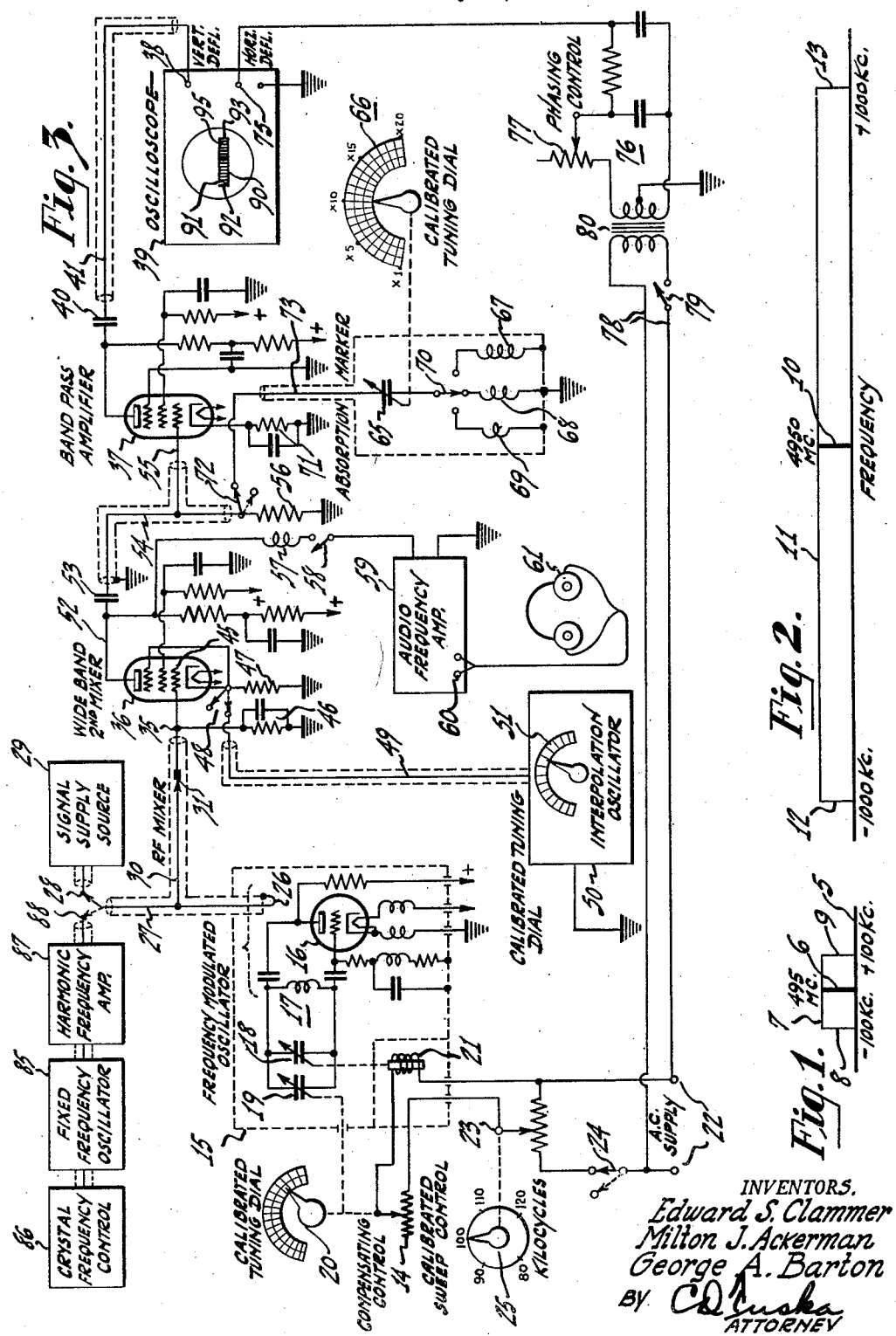

2,451,320

UNITED STATES PATENT OFFICE 2,451,320

FREQUENCY MEASURING SYSTEM

Edward S. Clammer, Merchantville, and Milton J. Ackerman, Camden, N. J., and George A. Barton, Bridgeport, Conn., assignors to Radio Corporation of America, a corporation of Delaware Application May 27, 1946, Serial No. 672,440

11 Claims. (Cl. 250—39)

This invention relates to frequency measuring systems for determining the frequency of unknown radio frequency signals, and is particularly adapted for determining the frequency of radio frequency signals in ultra high frequency and microwave ranges.

Wave meters, employing variably tuned circuits, are commonly used in measuring unknown signal frequencies. For measurements in the ultra high and microwave ranges tuned wavemeter circuits may take the form of variable concentric lines. Such meters are accurate only within certain limits and have the disadvantage that an appreciable amount of energy for their operation is required from the signal supply source being measured, thus precluding measurement accuracy where the signal energy may be relatively low, as in the ultra high and microwave frequency ranges.

It is the primary object of this invention, therefore, to provide an improved frequency measuring system which avoids the use of tuned circuits responsive to the signal frequency to be measured, thereby preventing energy losses incident to the use of such circuits, and which at the same time may be calibrated with reference to a crystal controlled or other fixed frequency source.

More particularly, it is an object of this invention, to determine the frequency of unknown high frequency signals, extending through a range, for example of from 1 mc. to 10,000 mc. and higher, without employing tuned measurement circuits responsive thereto, and without otherwise withdrawing any appreciable energy from the frequency source being measured, whereby greater measurement accuracy is attained at all frequencies and effective frequency measurement is made possible at high frequencies of the order above referred to.

It is also an object of this invention, to provide an improved frequency measuring system which may operate in a relatively low frequency range corresponding to the modulation width or deviation frequency, and useful deviation frequency harmonics, of a frequency modulated oscillator, the fundamental frequency or a harmonic of which is caused to beat with signals or an unknown higher frequency, to provide a measure of the frequency of said unknown higher frequency signals.

More specifically, it is an object of this invention, to provide a frequency measuring system having means for deriving and determining a harmonic of the deviation or modulation frequency of a lower frequency-modulated signal as a measurement index of the frequency of said signal and of an equal or higher frequency unknown signal when beating therewith to zero beat, whereby tuned measurement or wave meter circuits and the like, such as variable concentric line circuits, responsive to the unknown signal frequency, and energy losses inherent in the use thereof, may be avoided.

It is also a further object of the invention, to provide a measuring system for radio frequency signals wherein the frequency deviation of a frequency modulated signal, and the harmonics of said frequency deviation are utilized as a measure of the frequency of an unknown signal, and such frequency deviation and the useful harmonics thereof are arranged to be measured on the cathode ray pattern of a simple oscilloscope, thereby eliminating the use of frequency responsive meters and the like, and associated circuits.

The invention will, however, be better understood from the following description when considered in connection with the accompanying drawing, and its scope will be pointed out in the appended claims.

In the drawing, Figures 1 and 2 are frequency graphs representing a principle of operation of the invention, and Figure 3 is a schematic circuit diagram of a frequency measuring system embodying the invention.

Referring to Fig. 1, the horizontal abscissa line 5 represents a frequency, increasing in a positive direction to the right from a mid-frequency line 6, for a frequency modulated signal the energy output content of which is indicated by the vertical height of the line. Assuming such a signal to be frequency modulated with a deviation frequency of ±100 kc., as indicated, the energy envelope of the signal is indicated by the rectangular boundary lines 7, 8 and 9.

If now, as indicated the Fig. 2, a higher harmonic 10 of the frequency modulated signal 6 of Fig. 1 is derived, it will be found that the frequency modulation envelope 11, 12, 13 will have increased in width to provide a resultant deviation frequency of ±1000 kc. in the case of the tenth harmonic, for example. Therefore, by measuring the deviation frequency of the signal 10, and knowing its original deviation or sweep frequency, the harmonic order of the signal may readily be determined without resorting to measurement of frequencies higher than the deviation frequency harmonic, or 1000 kc. in the present example. Assuming that the original signal was 495 mc., the 10th harmonic will have, as indicated in Fig. 2, a frequency of 4950 mc.

In accordance with the invention, the frequency of the signal 6 is adjusted until a harmonic such as 10 is at zero beat with an unknown signal, thereby eliminating the harmonic 10 and leaving only the harmonic of the limit or deviation frequency of the signal 6, which is indicated between limits 12 and 13 of Fig. 2. If this is measured in terms of multiples of the swing or deviation frequency of the signal 6, the harmonic order of the deviation frequency of the signal 10 and the harmonic order of the signal 10 with respect to the signal 6 is determined. Therefore the unknown signal frequency may be determined by reference to the frequency 6 multiplied by the harmonic order just determined.

Thus it will be seen that such frequency determination obviates taking any actual frequency measurement at the frequency of the harmonic 10 or of the unknown signal. It will be appreciated, therefore, that in measuring or determining the frequency of ultra high frequency signals, this system has the advantage that the actual frequency determination is made at relatively low frequencies. This principle is particularly useful in measuring ultra high frequencies and microwave frequencies of the order of 300 mc. to 60,000 mc. and higher, since all measurements and computations are made with respect to the deviation frequency of a known frequency modulated signal and the harmonics thereof.

A system for carrying out the above measurement principles, and arranged for making frequency measurements in a range between 100 mc. and 10,000 mc., is shown, by way of example, in Fig. 3, to which attention is now directed.

In Fig. 3, 15 is a frequency modulated oscillator having a predetermined known frequency deviation and tunable in a range between the lowest frequency to be measured, or slightly below 95 mc. in the present example, and a higher frequency such as 500 mc. in the present example, having useful or strong higher harmonics up to the highest frequency to be measured. This will provide 60,000 mc. for the 120th harmonic and, in the present example to be considered, 10,000 mc., for the 20th harmonic. It is preferable also that the tuning range of the frequency modulated oscillator be at least two to one.

The oscillator 15 comprises an oscillator tube 16 having a tuned tank circuit 17 to which is connected suitable modulating means, such as variable modulating capacitor 18, and variable tuning means, such as a variable tuning capacitor 19, the latter being connected, as indicated, with a calibrated frequency indicating or tuning dial 20, by which the oscillator is variably tuned. It is preferable that the tuning adjustment of the dial or other indicating means be readable to a fair degree of accuracy, such as ±.5 per cent.

The modulating means 18 is connected with motor means 21, energized from alternating current supply leads 22 through a potentiometer device 23 and a control switch 24. The potentiometer device is arranged as a sweep or deviation frequency control means having a calibrated dial 25 on which adjustments may be made for varying the oscillatory movement of the motor means 21, through a greater or less range of travel.

This represents any suitable arrangement for modulating the oscillator at the rate of the alternating current supplied, to any predetermined deviation frequency, such as 100 kc., as indicated on the dial. The motor means may be operated to provide uniform frequency swing above and below the center frequency or either above or below to any desired degree. In the present example, the frequency swing may be assumed to be symmetrical about the center frequency.

In addition, a compensating device 14 is provided in circuit with the motor means 21 and connected as indicated, to be actuated by operation of the tuning dial 20 to maintain the adjusted deviation frequency constant as the tuning of the oscillator is varied.

The output of the oscillator is supplied to a pickup loop 26 at one end of a concentric transmission line 27, the opposite end of which is connected or plugged into the output terminal 28 of a signal supply source, indicated at 29, for which an exact frequency measurement is desired or the frequency of which is unknown.

The signal supply source is preferably unmodulated for measurement, and provides a frequency which is equal to or higher than the lowest tunable frequency of the oscillator 15 which has been assumed above to extend between 95 mc. and 500 mc. Also for the purposes of the present example, the frequency of the signal supply source 29 may be assumed to fall within the range of 95 mc. to 10,000 mc.

The transmission line 27 is tapped to provide a connection through a line 30 with an R.-F. signal mixer device 31, preferably of the crystal rectifier type, as indicated, and capable of operating in a frequency range between the lowest frequency of the oscillator 15 and the highest frequency of the unknown source 29.

It will be seen that, with this arrangement, harmonic signals from the oscillator 15 and a signal to be measured, from the source 29, are applied to the mixer means 31, and the difference frequency output therefrom is conducted from the mixer output circuit 35, through a wide band second mixer represented by the amplifier tube 36, and thence through a band pass amplifier represented by the amplifier tube 37, to the vertical deflection terminal 38 of an oscilloscope 39, a suitable output coupling capacitor 40 and a transmission line connection 41 being provided between the amplifier 37 and the oscilloscope.

The input circuit of the mixer stage 36 includes an input grid 45 and a grid-cathode return circuit in which is located a high frequency filter 46, effectively across the output circuit 35 of the R.-F. mixer 31, for removing the high frequency signal component therefrom. The cathode circuit of the mixer 36 includes a resistor or impedance 47, to which may be connected, through a switch 48 and a transmission line 49, a variable frequency or interpolation oscillator represented at 50, having an accurately calibrated tuning means represented by the dial 51. In the present example this may be considered to be tunable between 10 mc. and 20 mc. Accordingly, the second mixer is arranged to be responsive to a low pass band from 10 C. P. S. to 20 mc. thereby to include the highest frequency of the oscillator 50.

The output circuit of the mixer stage 36 is indicated at 52, and is coupled through a capacitor 53 with a circuit represented by a transmission line 54, terminating in the input grid circuit 55 of the band pass amplifier 37, in which is located a grid impedance or resistor 56.

A portion of the output signal from the wide band mixer 36 may be withdrawn from the output circuit 52 through an R.-F. choke coil 57 and a switch 58, and applied to an audio frequency amplifier 59, the output circuit 60 of which is connected with a pair of headphones 61, for purposes which will hereinafter appear. The amplifier 59 of the present example is preferably responsive to a frequency range of 10 C.P.S. to 15 kc.

The band pass amplifier 37 is preferably made responsive in a frequency range extending down to the lowest deviation frequency which may be applied to the oscillator 15, which in this case is 80 kc., and having an upper limit of frequency sufficient to pass the highest desired harmonic of the original deviation frequency. In this case, for measurements of the order of 10,000 mc., calling for the 20th harmonic of the highest frequency (500 mc.) established for the oscillator 15, the upper limit will be 2 mc. For a range of 60,000 mc., calling for the 120th harmonic, for example, the upper limit of the range of the band pass amplifier would be approximately 12 mc., assuming an original deviation frequency of $\pm 100$ kc.

The highest frequency to be passed by the wide band mixer 36, the band pass amplifier 37 and the frequency indicating device 39 may be derived from the formula:

(1) $\text{Freq. (max.)} = \frac{\text{Highest freq. of sig. source 29}}{\text{Highest freq. of osc. 15}} \times$ deviation freq. of osc. 15

In the present example, this would be determined as (2) $\text{Freq. (max.)} = \frac{10{,}000 \text{ mc.}}{500 \text{ mc.}} \times 100 \text{ kc.} =$
$2000 \text{ kc.} = 2 \text{ mc.}$ It is necessary to provide, in connection with the circuit between the oscilloscope and the R.-F. mixer 31, and preferably in connection with the band pass amplifier circuit, means for measuring the highest frequency of the deviation frequency harmonic which is passing through the amplifier system and appearing on the oscilloscope.

Oscillator circuits for this purpose are undesirable because of the introduction of harmonics which may provide false readings. In the present system, a tunable absorption marker for the oscilloscope pattern is provided to produce a null in the pattern which is movable along the pattern to the end thereof for determining the extreme frequency range of the circuit.

In the present example, this is indicated as a series tunable circuit comprising a variable capacitor 65 having an accurately calibrated tuning means including a dial 66 and one or more inductance elements 67, 68, 69, one of which may be connected in circuit with the capacitor 65 by suitable means, such as a selector switch 70.

The absorption marker circuit is connected across the input impedance 56 of the band pass amplifier 37, through a switch 72 and a connecting line 73. Further discussion of the calibration of the dial 66 will appear hereinafter. The tuning range of the absorption marker is preferably the same as that of the band pass amplifier, namely, 80 kc. to 2 mc. in the present example.

The horizontal deflection terminal 75 is connected with a suitable phasing control circuit 76, having a variable phasing control element 77 and is supplied with suitable alternating current through supply leads indicated at 78, a control switch 79, and an input transformer 80. The supply frequency is necessarily the same as provided at 22 for the modulation rate of oscillator 15 and accordingly the leads 78 are connected with the supply leads 22.

While the calibrated tuning dial 20 of the oscillator 15 is accurately calibrated to read, for example, to $\pm .5$ per cent, a greater degree of accuracy may be obtained with the system shown, for determining the unknown frequency through the use of external calibration means. Frequency readings accurate to $\pm .005$ per cent may be obtained with the present measurement system when the oscillator is further calibrated.

A preferred calibration means for the oscillator 15 is crystal controlled for greater accuracy and stability, and may comprise a fixed frequency oscillator 85 having crystal frequency control means indicated at 86, and a harmonic frequency amplifier indicated at 87, providing the fundamental and harmonic frequencies of the oscillator, at an output terminal indicated at 88, to which the transmission line 27 may be switched from the terminal 28 of the signal supply means, as indicated in dotted lines. In the present example, the oscillator 85 is fixed-tuned to 10 mc., thereby providing a fundamental of 10 mc. and a series of harmonics spaced 10 mc. apart. The interpolation oscillator 50, tunable between 10 and 20 mc., is used in conjunction with the oscillator 85 for calibrating the oscillator 15, as will hereinafter appear.

The operation is as follows: As previously pointed out, the oscillator 15 is an ultra-high-frequency oscillator, variably tunable between 95 mc. and 500 mc. and frequency modulated at a 60-cycle rate, for example, with a predetermined deviation or sweep frequency such as $\pm 100$ kc., which is accurately determined and adjusted in connection with the calibrated sweep control 23—25 and the compensation control means 14.

The modulated output signal of the oscillator is mixed in the crystal mixer 31 with an R.-F. signal the frequency of which is to be measured and preferably without modulation, introduced at the input terminal 28 from a signal source 29.

The generator or oscillator 15 is variably tuned until a harmonic of the signal therefrom produces a zero beat with the unknown signal from the source 29. This zero beat appears in the oscilloscope pattern, indicated at 90, as a null 91. The band of frequencies represented in the oscilloscope pattern extend from zero to some frequency determined by the order of the harmonic of the modulation frequency of the signal from the generator or oscillator 15. The sweep pattern 90 on the oscilloscope then has a left-hand boundary 92 and a right-hand boundary 93 between which the above band of frequencies is represented. The boundaries 92 and 93 represent the highest harmonic of the basic modulation or deviation frequency of $\pm 100$ kc., corresponding to the harmonic of the oscillator 15 which is then at zero beat with the unknown signal from the source 29.

No ultra high frequency signal will appear in the output circuit 35 of the R.-F. mixer 31 because of the low pass filter 46, hereinbefore referred to, and since the band pass amplifier 37 prevents the passage of frequencies below 80 kc., the null 91 appears when the two signals are at zero beat, as the lower output frequencies do not, therefore, reach the oscilloscope. In addition to the filter 46, the upper cut-off frequency of the band pass amplifier prevents the passage of any of the R.-F. signal frequencies or the sum frequencies thereof as produced by the input signal at 28 and the oscillator 15.

In the present arrangement, the amplifiers 36 and 37 pass the modulation frequency and its harmonics up to any desired harmonic, which in the present example is the 20th, although for practical purposes, as hereinbefore mentioned, the 120th harmonic may be passed if desired for measurement of higher frequency unknown signals. In this connection, it may be pointed out that for the measurement of higher frequency signals, the tuning range of the oscillator 15 may be increased, for example, to a range between 1000 mc. and 3000 mc. For lower frequencies, the range may be lowered, for example, to cover a tuning range of 1 to 5 mcs.

The band width of the oscilloscope pattern between the limits 92 and 93 may now be read by the absorption marker, which is connected in circuit by closing the switch 72 to absorb some of the energy of the harmonic signal passing through the amplifier 37 to the oscilloscope.

In the present example, the absorption marker is connected across the input resistor of the amplifier 37 as an impedance whose value is minimum at resonance. The tuning dial 66 is tuned until a slight null 95 appears in the oscilloscope pattern. This indicates the frequency to which the marker is tuned. By operating the phasing control 76, the zero beat null 91 may be made to appear at one edge 92 of the pattern as shown and the highest sweep or deviation frequency would then appear on the opposite edge 93. By turning the dial 66 to move the marker null to coincide with said opposite edge 93 of the oscilloscope pattern, the frequency reading of the calibrated dial of the marker will then indicate the limit frequency in the pattern.

Since the deviation frequency of the oscillator 15 is known ($\pm 100$ kc. in the present example), the dial reading, in frequency, of the absorption marker may be divided by that value to determine the order of the harmonic of the original signal at the oscillator 15 which is then at zero beat with the unknown signal from the source 29. Therefore this result is an index of the frequency of the source 29. The latter frequency may then be obtained approximately by multiplying the frequency reading on the dial 20 of the oscillator 15 by the harmonic order derived as above. Assuming that the dial 66 of the absorption marker then reads 1000 kc., a harmonic order of 10 is indicated, and if the dial 20 of the oscillator 15 then reads 495 mc., the unknown frequency is 10 times 495 mc. or 4950 mc.

It is obvious, therefore, that the calibrated tuning dial 66 of the absorption marker may be calibrated to read the multiplication factor or harmonic order instead of frequency, and may be reset to indicate the factor directly, as, for example, in the position shown for the 10th harmonic. This simplifies the operation of measuring the frequency of the unknown signal, since it is then only necessary to multiply the dial reading at 66 by the dial reading at 20 to obtain a close approximation of the unknown frequency when the null 95 on the oscilloscope pattern is at the end of the pattern and the signal from the oscillator 15 and the unknown signal are beating at zero beat.

Thus it will be seen that the harmonic of the deviation frequency is an index of the frequency of the modulated signal and of the unknown signal when at zero beat with the modulated signal. Furthermore, no measurements are required by this system which involve the tuning of ultra high frequency or microwave circuits or the absorption of any appreciable energy at the frequency to be measured. Further in accordance with the invention, exact frequency measurements to $\pm .005$ per cent., for example, may then be determined if desired as hereinbefore referred to.

This entails (1) removing the frequency modulation from the oscillator 15 by opening the switch 24 while maintaining the tuning of the oscillator 15 for an exact zero beat of one of its harmonics with the incoming signal from the source 29. The exact zero beat is preferably determined by audible means, such as the headphones 61, by closing the switch 58 and energizing the amplifier 59, and then observing the audible zero beat between the signal from the source 29 and from the oscillator 15 at the output of the wide band second mixer 36.

The next step (2) is to remove the concentric line 27 from connection with the terminal 28 and to reconnect it to the terminal 88 of the harmonic frequency amplifier 87 which in turn is connected with the fixed frequency oscillator 85. With the oscillator and harmonic amplifier energized, a harmonic of the 10 mc. signal will beat in the R.-F. mixer 31 with the signal from the oscillator 15 to produce a difference frequency between 10 and 20 mcs. at the output circuit 35 of the mixer 31.

For example, if the dial 20 of the oscillator 15 is set at 495+ mc., the 48th, 49th, 50th, and 51st harmonics of the fixed frequency oscillator 85 will beat therewith to produce beat frequencies of approximately 15, 5, 5 and 15 mc., respectively, at the output circuit 35 of the R.-F. mixer 31, and all will therefore pass through the wide band mixer 36 which is arranged to pass frequencies up to 20 mc. It is obvious that other beat frequencies will be attenuated.

The next step (3) is to close the switch 48 and place the interpolation oscillator 50 in operation to supply signals to the mixer 36. The dial 51 is then adjusted until the interpolation oscillator provides a zero beat with one of the above beat frequencies. This zero beat is noted in the headphones 61, the dial 51 is read as accurately as possible and the reading is added to or subtracted from the harmonic of the oscillator 85 which is beating with the oscillator 15.

For example, if the dial of the oscillator 15 reads 495+ mc. and the dial of the interpolation oscillator 50 reads 15.123 mc., it may be determined which multiple of 10 mc. plus 15.123 mc. equals approximately 495+ mc. The result is that the 48th harmonic or multiple of the 10 mc. output of the fixed frequency oscillator 85 satisfied this requirement. Therefore, the frequency of the oscillator 15 is $48 \times 10$ mc. or 480 mc., plus the dial reading 51 of the oscillator 50, or +15.123 mc., which equals 495.123 mc. Since the calibrated tuning dial of the absorption marker indicated a harmonic order of 10, the frequency of the unknown source at 29 is $10 \times 495.123$ mc., or 4951.23 mc.

Frequency measurements for other frequencies are made in a similar manner. The ultimate accuracy is largely determined by the accuracy with which the reading of the interpolation oscillator may be made. At present a higher accuracy than $\pm .005$ per cent may be attained.

Furthermore, it will be seen that the measurement of signal frequencies in the range above 100 mc., and at present extending through 60,000 mc., is practicable with the system of the present invention without withdrawing appreciable energy from the supply circuit, and therefore without modifying in any way its frequency output during the measurement operation.

While the invention has been shown and described in connection with a circuit for the measurement of present normal ultra high frequency signals, it should be understood that it is not limited thereto and may be applied in a similar manner to the measurement of any R.-F. signal.

We claim as our invention:

1. In a frequency measuring system, a tunable frequency modulated oscillator having a predetermined deviation frequency, means for mixing the signal output of said oscillator with a second signal to be measured to provide a beat frequency signal, means for varying the tuning of said oscillator to provide zero beat at said mixer means between a harmonic frequency signal therefrom and said second signal, whereby said harmonic frequency signal equals the frequency of the second signal and provides a harmonic of said predetermined deviation frequency of a corresponding order, tuning indicator means for determining the frequency of the oscillator when said harmonic frequency signal therefrom is at zero beat with said second signal, and calibrated tuning and indicating means coupled to said mixer means and being selectively responsive to the deviation frequency and harmonics thereof for determining the harmonic order of said deviation frequency harmonic as an index of the frequency of said signal and of the second signal to be measured for multiplying with said determined frequency of the oscillator to derive the frequency of the second signal.

2. In a frequency measuring system, a tunable frequency modulated oscillator having a predetermined deviation frequency, calibrated frequency indicating means for said oscillator, means for mixing the signal output of said oscillator with a second signal to be measured to provide a beat frequency signal, means for varying the tuning of said oscillator to provide zero beat at said mixer means between a hormonic frequency signal therefrom and said second signal, whereby said harmonic frequency signal equals the frequency of the second signal and provides a harmonic of said predetermined deviation frequency of a corresponding order, and calibrated tuning and indicating means coupled to said mixer means and being selectively responsive to the deviation frequency and harmonics thereof for determining the harmonic order of said deviation frequency harmonic as an index of the frequency of said harmonic frequency signal and of the second signal to be measured, and means including a fixed frequency signal source for determining with a predetermined degree of accuracy, the frequency of said oscillator with reference to said calibrated frequency indicating means, thereby to provide a multiplying factor for said index further to determine the frequency of said second signal with a corresponding degree of accuracy.

3. A frequency measuring system comprising, in combination, means for producing a frequency modulated signal having a predetermined deviation frequency, means for mixing said modulated signal and a second signal to be measured in frequency, to produce a beat frequency output, means for varying the frequency of the first named signal to provide zero beat between a harmonic thereof and the second signal, band pass circuit for deriving the corresponding deviation frequency harmonic of said first named signal from the beat frequency output of said mixing means, and means for determining the order of said last named harmonic as an index of the frequency of the second signal, said last named means including a circuit coupled to the band pass circuit and tunable to said deviation frequency harmonic, and a device coupled to the output of the band pass circuit for indicating the tuning response of said last named circuit at said deviation frequency harmonic.

4. A frequency measuring system comprising, in combination, means for producing a frequency modulated signal having a predetermined deviation frequency, means for mixing said modulated signal and a second signal to produce a beat frequency output, calibrated tuning means for varying the frequency of the first named signal to provide zero beat between a harmonic thereof and the second signal, a band pass circuit for deriving the corresponding deviation frequency harmonic of said first named signal from the beat frequency output of said mixing means, means for determining the order of said last named harmonic frequency as a multiplying factor for the frequency of the first named signal to approximately determine the frequency of the second signal, said last named means including a circuit coupled to the band pass circuit and tunable to said deviation frequency harmonic, and a device coupled to the output of the band pass circuit for indicating the tuning response of said last named circuit at said deviation frequency harmonic, and crystal controlled means for further calibrating said first named means to finally determine the frequency of the second signal.

5. A frequency measuring system comprising in combination, a frequency modulated oscillator having a predetermined deviation frequency, signal mixer means coupled to said oscillator for receiving the signal output therefrom, means for applying a signal to be measured to said mixer means, means for tuning said oscillator to provide zero beat at said mixer means between a harmonic frequency signal therefrom and the applied signal, calibrated means for indicating the frequency of said oscillator as a first index of the frequency of said applied signal, band-pass amplifier means coupled to the output of said signal mixer having a pass band which includes the deviation frequency of said oscillator and a predetermined number of harmonics thereof, and means comprising a tunable circuit coupled to the mixer means and an indicator device coupled to the band pass amplifier means for measuring the deviation frequency harmonic at the output of the mixer device when said oscillator is tuned to provide said zero beat, as a second index of the frequency of said applied signal.

6. In a frequency measuring system, a tunable frequency modulated oscillator having a predetermined deviation frequency, calibrated frequency indicating means for said oscillator, means for mixing the signal output of said oscillator with a second signal to be measured to provide a beat frequency signal, means for varying the tuning of said oscillator to provide zero beat at said mixer means between a harmonic frequency signal therefrom and said second signal, means for determining the harmonic order of the deviation frequency output of said mixer means, said last named means comprising an oscilloscope having a deflection element thereof coupled to said mixing means, a band-pass amplifier in said coupling having a predetermined band-pass range including the fundamental of said deviation frequency and a predetermined higher harmonic thereof, and a calibrated absorption marker for said oscilloscope coupled to said amplifier and having a tuning range of the order of the pass band of the amplifier.

7. A frequency measuring system comprising in combination, a frequency modulated oscillator having a predetermined frequency deviation, a calibrated frequency indicating tuning device for said oscillator, a transmission line coupled to the oscillator for receiving a high frequency signal to be measured in frequency, an R.-F. signal mixer device connected with said transmission line responsive to said oscillator and high frequency signals to provide both a beat frequency tunable to zero beat by said oscillator and a resultant harmonic of the oscillator deviation frequency, a band pass circuit coupled to the output of the mixer device providing a frequency pass band for said deviation frequency harmonic, a tunable circuit coupled to the output of the signal mixer device and an oscilloscope device having a vertical deflection control terminal connected with the output of the band pass circuit responsive to the deviation frequency harmonic at the output of the mixer device, said oscilloscope device having a horizontal deflection control terminal, an alternating current modulation supply circuit for the oscillator connected with said last named terminal to supply deflection potential thereto, a phasing control network in said connection, and a calibrated frequency indicating tuning device for said last named tunable circuit providing a frequency multiplying factor for the frequency indication of the first named calibrated frequency indicating tuning device, as a measure of the frequency of said high frequency signal.

8. In a frequency measuring system, a tunable frequency modulated oscillator having a predetermined deviation frequency, means for mixing the signal output of said oscillator with a second signal to be measured in frequency, means for varying the tuning of said oscillator to provide zero beat between a harmonic frequency signal therefrom and said second signal, calibrated frequency indicating means for said oscillator, means for determining the harmonic order of the deviation frequency of said harmonic frequency signal, said last named means comprising an oscilloscope having a vertical deflection element thereof coupled to said mixing means, band-pass amplifier means in said coupling having a predetermined band-pass range including the fundamental of said deviation frequency and a predetermined higher harmonic thereof, a tunable marker circuit for said oscilloscope coupled to said amplifier and having a calibrated tuning range of the order of the pass band of the amplifier means, and means for calibrating said first named oscillator to a predetermined degree of accuracy to finally determine the frequency of said signal to be measured, said last named means comprising a harmonic amplifier having an output connection with said mixing means, a crystal controlled oscillator coupled to said harmonic amplifier and tuned to a frequency providing a series of harmonics within the tuning range of said first named oscillator, and a variably tunable interpolation oscillator coupled to the input side of said amplifier for determining a harmonic of the crystal controlled oscillator which is effective in said tuning range to beat with said first named oscillator to provide substantially zero beat.

9. In a frequency measuring system, the combination of a frequency modulated oscillator tunable in a range between the lowest frequency to be measured and a higher frequency having an effective harmonic of the order of the highest frequency to be measured, means providing a calibrated tuning dial for said oscillator, means for adjusting the frequency swing of said oscillator to provide a predetermined known deviation frequency therefor, a radio frequency signal mixer device coupled to said oscillator to receive the signal output therefrom, said mixer device being of the crystal type, means providing a signal supply connection with said mixer device for applying thereto signals to be measured in frequency, a second mixer means coupled to said radio frequency mixer device to receive the beat frequency output therefrom, a crystal controlled oscillator tuned to a frequency providing a series of harmonics within the tuning range of said first named oscillator, a harmonic frequency amplifier coupled to said crystal controlled oscillator to receive the signal output therefrom, means for connecting said radio frequency mixer device with the output of said harmonic amplifier, band-pass amplifier means coupled to the output of said second mixer device having a pass band which includes the deviation frequency of said frequency modulated oscillator and a predetermined number of harmonics thereof, an oscilloscope device having a viewing screen and having a vertical deflection element thereof coupled to the output of said band-pass amplifier means, phasing means for said oscilloscope device, and means for measuring the highest frequency of a deviation frequency band of signals applied to said oscilloscope through said band-pass amplifier, comprising a tunable signal absorption circuit coupled to said band-pass amplifier whereby it is effective at its resonant frequency to produce a pattern null on the oscilloscope screen.

10. A frequency measuring system comprising in combination, a frequency modulated oscillator having a predetermined frequency deviation, a calibrated frequency indicating tuning device for said oscillator, a transmission line coupled to the oscillator for receiving a high frequency signal to be measured in frequency, an R.-F. signal mixer device connected with said transmission line responsive to said oscillator and high frequency signals to provide both a beat frequency tunable to zero beat by said oscillator and a resulting harmonic of the oscillator deviation frequency, a band pass circuit coupled to the output of the mixer device providing a frequency pass band for the deviation frequency and the highest desired harmonic thereof, means comprising a tunable circuit coupled to the output of the signal mixer device and a frequency responsive indicator device coupled to the output of the band pass circuit for measuring the deviation frequency harmonic at the output of the mixer device when said oscillator is at zero beat with the high frequency signal, thereby to provide a frequency multiplying factor for the frequency indication of the first named tuning device, as a measure of the frequency of said high frequency signal.

11. A frequency measuring system comprising in combination, a frequency modulated oscillator, a modulator device for applying a predetermined frequency deviation thereto, a calibrated frequency indicating tuning device for said oscillator, an alternating current supply circuit connected with said modulator to provide a predetermined modulation rate for the oscillator, a control circuit in said last named connection having a movable control element responsive to operation of the tuning device for maintaining the deviation frequency substantially constant as the oscillator tuning is varied, a transmission line coupled to the oscillator for receiving a high frequency signal to be measured in frequency, an R.-F. signal mixer device connected with said transmission line responsive to said oscillator and high frequency signals to provide both a beat frequency tunable to zero beat by said oscillator and a resultant harmonic of the oscillator deviation frequency, a band pass circuit coupled to said mixer device for passing said deviation frequency harmonic, means comprising a tunable circuit coupled to the mixer device and a frequency responsive indicator device coupled to the band pass circuit for measuring the deviation frequency harmonic at the output of the mixer device when said oscillator is at zero beat with the high frequency signal, thereby to provide a multiplying factor for the frequency indication of the first named tuning device, as a measure of the frequency of said high frequency signal.

EDWARD S. CLAMMER.
MILTON J. ACKERMAN.
GEORGE A. BARTON.

REFERENCES CITED

The following references are of record in the file of this patent:

UNITED STATES PATENTS

| Number | Name | Date |
|---|---|---|
| 2,321,315 | Peterson | June 8, 1943 |
| 2,324,077 | Goodale | July 13, 1943 |